I. BOGART.
Corn Planter.
No. 103,289.
2 Sheets—Sheet 1.
Patented May 24, 1870.
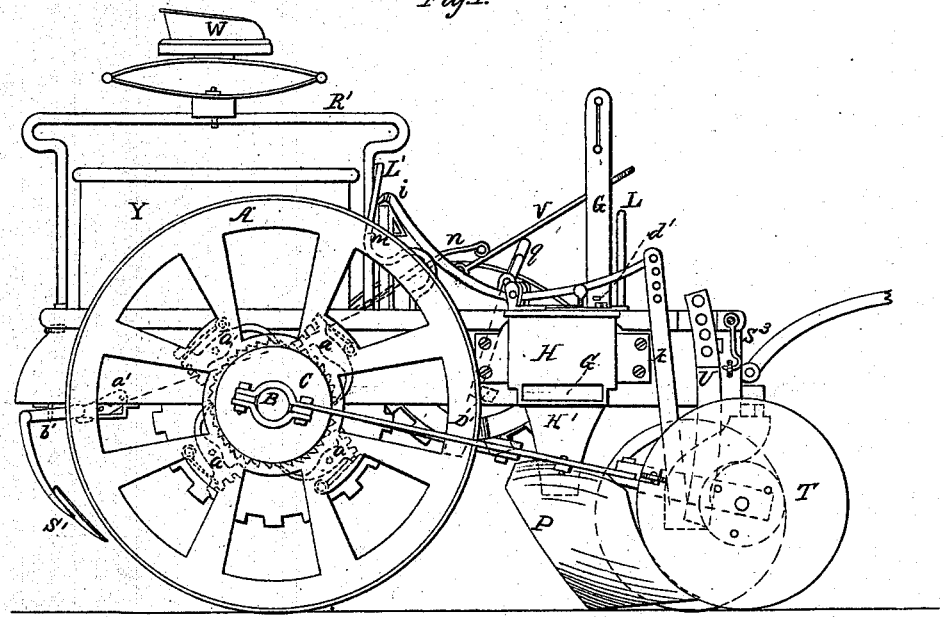
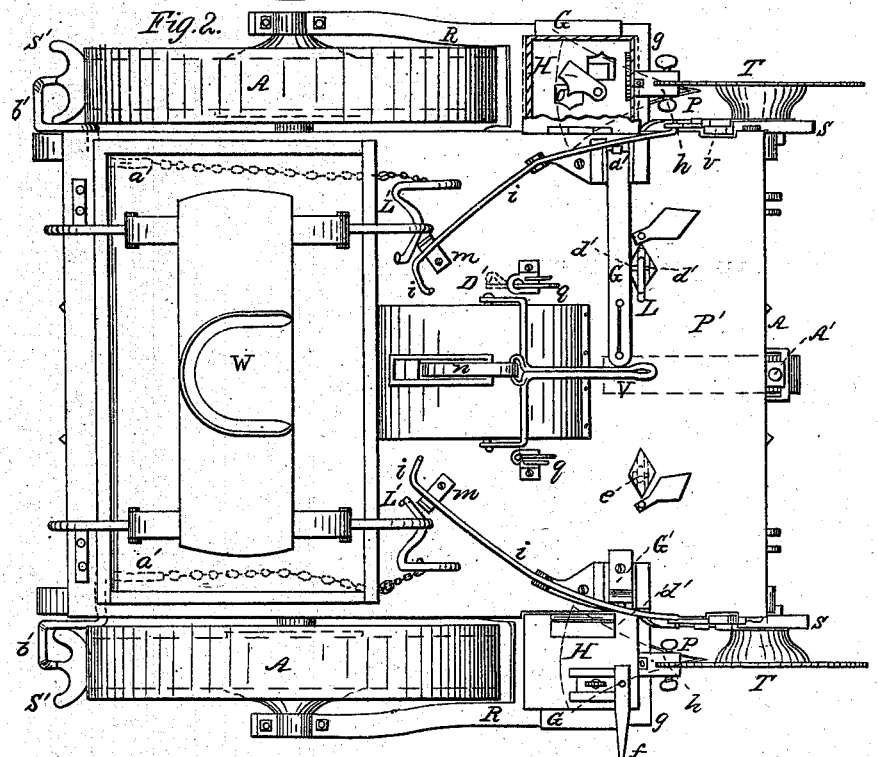
Witnesses:
Inventor:

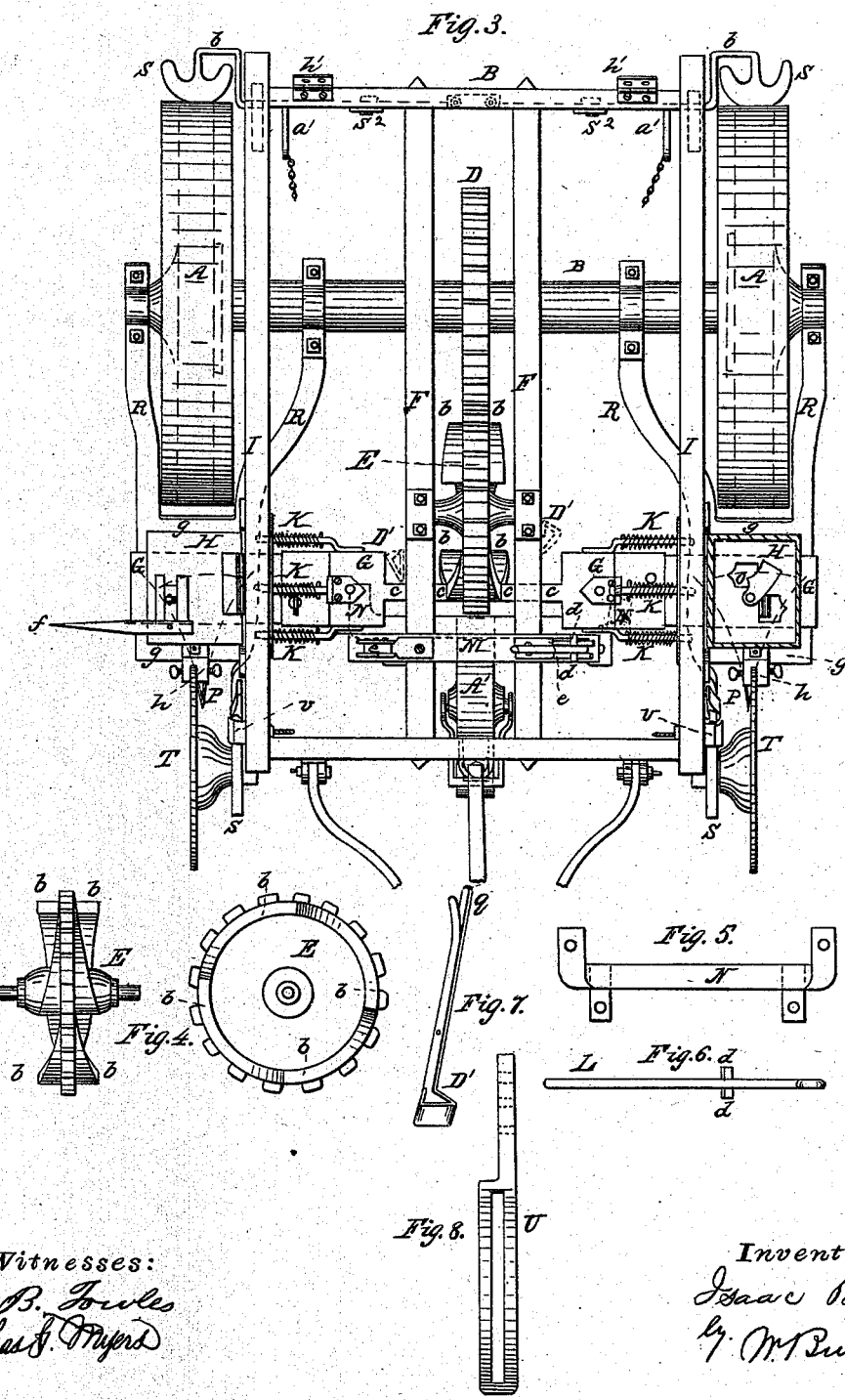

UNITED STATES PATENT OFFICE.

ISAAC BOGART, OF NEWPORT, INDIANA.

IMPROVEMENT IN GRAIN-PLANTER.

Specification forming part of Letters Patent No. 103,289, dated May 24, 1870.

*To all whom it may concern:*

Be it known that I, ISAAC BOGART, of Newport, Vermillion county, State of Indiana, have invented a new and Improved Grain-Planter; and I do hereby declare that the following is a clear, full, and exact description of the construction and operation of the same, reference being had to the accompanying drawings, making a part of this specification, in which—

Figure 1 is a side elevation. Fig. 2 is a top view. Fig. 3 is a top view with the platform removed. Fig. 4 is a detail view of the top and side of the cam-wheel. Fig. 5 is a detail view of the bar with which the feed-slides are operated by hand. Fig. 6 is a detail view of the lever with which the bar shown in Fig. 5 is operated. Fig. 7 is a detail view of the feed-slide stops. Fig. 8 is a detail view of the cutter-stirrups.

Like letters in the different figures of the drawings represent like parts of the machine.

The nature of my invention is described as follows, viz: The driving-wheels are each provided with several ratchets, and so arranged on the axle as that when the machine moves backward they revolve upon the axle; but when it moves forward the ratchets engage the cogs on ratchet-wheels attached to the axle, and thus revolve the axle, upon which is keyed a cog-wheel, which engages another cog-wheel provided with cams on both sides, which, in combination with springs, operates feed-slides, by means of which the grain is deposited in proper quantities and distances apart; and in combination with these feed-slides and the proper hoppers for containing the grain and tubes for depositing it, double-mold-board plows, having rolling cutters, are arranged for forming the furrows to receive the grain, and so adjusted that they may be raised separately out of the ground and over obstructions.

Pointers and sight-standards are arranged on the front part of the machine, to aid in obtaining the range of the cross-rows. Levers and other suitable devices are provided for planting by hand the first hills at the end of the rows, and in passing around stumps and other obstructions. Stops are arranged for holding the feed-slides out of gear when required, and the platform of the planter is hinged or pivoted, so that it may be raised up to allow access to the machinery below it.

The driving-wheels A A are of like dimensions, each being eighty-eight inches in circumference when the space of forty-four inches is required between the hills, and are provided on the inside with four or more ratchets, $a\ a\ a\ a$, arranged unequal distances apart, so that one of them at least on each wheel will be in position to immediately engage the cogs in the ratchet-wheels C C when the machine moves forward. (See dotted lines in Fig. 1.)

The ratchet-wheels C C are fastened upon the axle B, so that the forward motion of the driving-wheels revolves the axle, which has its bearings in the beams F F. When the machine moves backward the driving-wheels revolve upon the axle, the ratchet sliding over the cogs in the ratchet-wheels.

D is a cog-wheel, securely keyed to the axle B, arranged to engage the cogs in the cam-wheel E, which has its bearings in boxes attached to beams F F, and is provided with two cams, $b\ b$, on each side, of equal dimensions and precisely opposite each other, as seen in Fig. 3. The cogs of wheels D and E should be made and arranged to fit neatly, so as to avoid loss of motion by the driving-wheels, to secure uniform distances between the hills.

Each machine may be provided with one or more extra cam-wheels, similar to wheel E, except having a greater number of cams; or the cams may be so constructed and attached as to be removable, so as to change their number, and thus vary the distances between the hills of the grain.

To secure a distance of twenty-two inches between the hills, a wheel with four cams on each side should be used; and a wheel with five cams on each side, properly arranged, will place the hills seventeen and two-thirds inches apart, and, in like manner, any required distance between the deposits of the grain may be secured.

G G represent feed-slides, having rub-bars $c\ c$, which extend through and have their bearings in the beams F F, so that the ends impinge against the face of cams $b\ b$. The feed-slides pass through beams I I and under hoppers H H, which are provided with two bottoms each, one above and one below the feed-slides, the upper bottoms having two holes in each, one of which (marked O) is nearer the inside ends of the hoppers, and is provided with a lid. (See Figs. 2 and 3.)

K K K represent three guides attached to each feed-slide, and extending into beams I I, to which guides are attached spiral springs, which impart the reverse motion to the feed-slides.

L is a lever, provided with side pivots, d d, arranged to bear and work in notches in boxes e e on the ends of a bar, M. N is a loose bar, arranged to slide back and forth in the proper bearings attached to the bottoms of beams F F, and is made with cross-bars at the ends, having holes for attaching the said bar to the feed-slides, and for receiving the lower end of lever L, by means of which the feed-slides may be operated by hand. (See Fig. 7 and dotted lines in Fig. 3.)

On the top of the hopper-lids pointers f f are arranged on pivots, so as to be adjusted to any required position.

P P are double mold-board plows, with open space between the molds to admit the grain-tubes H' H', which are attached to the bottom of the hoppers. The bottoms of the plows are so constructed as to form a level surface at the bottom of the furrows, of sufficient width to allow the grain, as it is deposited, to separate a proper distance apart. The plows are bolted at the top to the under side of movable beams R R, which are attached by proper bearings to the axle B, one on the inside of the wheel and the other at the end of the axle, and are connected and stayed by the cross-bars g g. (See Figs 1 and 3.)

S S represent beams, bolted to and forming an elongation of inside movable beams R R.

T T represent cast-steel circular cutters, each having one hub on the inside, and arranged to revolve upon a spindle, which extends through the hub and through beam S, and is made with a screw on the end and a shoulder a proper distance from the end, to bear against the beam S, to which it is securely held by the screw-nut on the end. (See Fig. 3.)

Stays h h, with set-screws, are attached to cross-bars g g, to support and steady the cutters. (See Figs. 2 and 3.)

U U are adjustable stirrups, with elongated slots at the lower ends and three or more holes at the upper ends, for holding beams S S and regulating the depth of the plows. (See Figs. 1 and 8.)

Two levers, i i, are arranged on the platform, the rear ends of which extend back to the driver's seat, and are shaped so as to be operated by his feet, and the forward ends are attached to standards k k, the lower ends of which are attached by a single bolt (to allow necessary play) to the beams S S, and the upper ends are provided with several holes for raising and lowering the plows. When the plows are raised by the levers i i they are held in position by the spring-catches m m near the driver's seat.

V represents a lever, provided with a pawl, n, over the cam-wheel E, for operating the planter by hand in planting the first hills at the ends of the rows.

D' D' are stops under the platform, for holding the feed-slides out of gear when required, and are operated by levers q q, working on side pivots or bolts having bearings on the platform, and are provided with stay-springs and stops, as seen in Figs. 1, 2, and 7.

W represents a seat on springs, attached to supporting-rods R' R' by means of bolts, with hooks or clasps at the lower ends, and screws with nuts at the upper ends, so that the position of the seat may be changed to balance the weight of the assistant operator, whose position is on the front part of the platform. (See Fig. 1.)

Y represents a caisson under the seat, for carrying the extra cam-wheels, tools, &c. S¹ S¹ represent scrapers, made nearly in the shape of a horseshoe, with the points or toes downward, and are attached to bars b' b', provided with arms a' a', which bars are attached to the lower side of the back beam, B', by a single bolt at the inner ends, and supported at the outer ends by slotted supports or boxes to allow the necessary play, the said bars being connected by chains to levers L' L' in front of the driver's seat, as shown in Figs. 1, 2, and 3. When not in operation the scrapers are held back from the wheels by the springs S² S² operating against the bars. (See Fig. 3.)

G' G' are sight-standards, attached by pivots or hinges to the top of the platform, and provided with stops or spurs d' d', to hold the standards in a perpendicular position for aiding the operator to obtain the range of the cross-rows.

The platform P' is attached by hinges or pivots h' h' at the back end to the cross-beam B', and is held in position in front by hooks and staples S³. (See Figs. 1 and 3.)

A' is a pivoted wheel, attached to and working under the front cross-beam, and which carries the front part of the machine.

The tongue is made with side braces, and is attached to the front cross-beam of the machine in the center and near each end by bolts or equivalent devices, to allow the required up and down play when the machine is in motion. (See Fig. 3.)

Each machine may be provided with several sets of feed-slides, having different-sized holes to suit different kinds of grain.

I contemplate extending the center guides, K K, entirely through the beams I I into the hoppers H H, and attaching to the ends of said guides, inside of the hoppers, rods or wires, provided with two prongs on each side, extending over the holes in the bottom of said hoppers, for the purpose of stirring and thus aiding to feed the grain.

I contemplate, also, attaching to the under side of beams I I springs of proper force to bear upon the cross-bars g g of the plow-beams, for the purpose of aiding the plows to enter the ground and for holding them in the ground. These springs should not be of such force as to prevent the plows from being readily raised to pass over obstructions.

The circular cutters cut the grass and other similar rubbish before the plows, and thus prevent them from choking, and the double-mold plows part the dirt and leave the sides of the furrows in a raised position and inclining toward each other, which are pressed down and together, thus closing the furrows and thoroughly covering the grain by the driving-wheels, which are arranged to follow upon the furrows. The position of the adjustable seat may be varied, so as to properly balance the weight of the assistant operator.

In planting so as to form regular cross-rows, the machine is moved to the proper place for dropping the first hills, which is performed by hand by means of the lever V and pawl $n$ operating upon wheel E. A stake is then set in range with these first hills, and the machine driven to the other end of the rows, where another stake is set in range with the last hills. The machine is then turned and brought to a position where sight-standards G' G' are in range with the last-named stake, and the first hills of these new rows dropped by lever V, as before, and so on.

Uniformity in the cross-rows depends upon the accurate construction of the machine, as described, so as to avoid loss of motion, and also upon proper care in starting in range with the stakes at the ends of the rows.

Where it may be necessary to deviate from a straight line to avoid obstructions, the dropping process may be performed by the lever L and bar N, in which case the lids are removed from the inner holes, O O, in the hoppers H H, and then each movement of the lever deposits the grain in both of the rows, pointers $f$ being used to aid in obtaining the range of the rows.

When the grain is planted in drills, and regular cross-rows are not required, the pointers and standards are turned around and folded down out of the way.

The plows and cutters are raised and lowered, as required, and the scrapers $S^1 S^1$ are operated by the driver's feet upon the levers $i\ i$ and L' L'. A slight pressure upon the levers L' L' will bring the points of the scrapers to bear upon the face of the driving-wheels, while a heavier pressure will cause the entire sides of the scrapers to bear upon the face of the wheels.

By unfastening the hooks $S^3 S^3$, the platform may be raised up to allow access to the machinery below.

When the feed-slides G G are not required to be in operation, stops D' D' are, by levers $q\ q$, thrown forward between the ends of the slides and beams F F, and thus the rub-bars $c\ c$ are held out from cams $b\ b$, allowing free motion to wheel E.

Having thus fully described my invention, what I claim therein as new, and desire to secure by Letters-Patent, is—

1. Cam-wheel E, in combination with driving-wheels A A, having ratchets $a\ a\ a\ a$, ratchet-wheels C C, cog-wheel D, feed-slides G G, having guides and springs K K, and hoppers H H, substantially as described.

2. The combination of lever L and bar N with feed-slides G G and hoppers H H, substantially as described.

3. The lever V, with pawl $n$, in combination with wheel E, feed-slides G G, and hoppers H H, substantially as described.

4. The combination of the double mold-board plows P P and circular cutters T T with the devices of a grain-planter, substantially as described.

5. Stops D' D', in combination with the feed-slides G G of a grain-planter, substantially as described.

6. The sight-standards G' G' and pointers $ff$, in combination with the devices of a grain-planter, as described.

7. The hinged platform P', in combination with the devices of a grain-planter, as herein described.

In attestation of the foregoing specification of my improved grain-planter I have hereunto subscribed my name in the presence of two witnesses.

ISAAC BOGART.

Witnesses:
   Jos. C. Cooke, M. D.
   J. P. Campbell.